July 20, 1965 A. D. ARSEM 3,196,406

ELECTRONIC DELAY LINE

Filed Sept. 26, 1962 2 Sheets-Sheet 1

INVENTOR.
Alvan Donald Arsem
BY
Olson, Trexler
Wolters & Bushnell attys.

July 20, 1965 A. D. ARSEM 3,196,406

ELECTRONIC DELAY LINE

Filed Sept. 26, 1962 2 Sheets-Sheet 2

INVENTOR.
Alvan Donald Arsem
BY
Olson, Trexler, Wolters & Bushnell attys.

United States Patent Office 3,196,406
Patented July 20, 1965

3,196,406
ELECTRONIC DELAY LINE
Alvan Donald Arsem, Buffalo, N.Y., assignor to The Wurlitzer Company, Chicago, Ill., a corporation of Ohio
Filed Sept. 26, 1962, Ser. No. 226,368
10 Claims. (Cl. 340—173)

This invention is concerned with the reproduction of electric signals with a controlled time delay, and more specifically is concerned with an electronic delay line.

The desirability or necessity of providing electric or electronic delay is well recognized in various arts, including underwater weapons systems, radar, music, and other diverse fields. Previous devices or techniques for producing delay have had serious drawbacks. Some have been frequency sensitive, producing a different amount of delay in accordance with the impressed frequency. Others have been capable of producing only a very short delay, or only a very long delay, or a fixed delay, or any or all of these. Most have been quite limited in the figure of merit which can be attained.

The principle utilized in the present invention is that of attaining signal delays in an electronic delay line by means of multiple sampling and storage. There is a fundamental theorem known as the sampling theorem (Shannon: The Mathematical Theory of Communication) which shows that a signal may be sampled at discrete points, and that a replica of the signal can be generated from the samples through a filtering process, provided that the sampling rate $f_s \geqq 2f_0$ where $f_0$ is the maximum signal bandwidth. It is necessary that the signal contain no components higher than the specified bandwidth $f_0$.

By making use of the sampling principle and further by introducing a time delay between the sampling process and reconstruction process, the total signal can be delayed by a controlled amount.

Accordingly, it is an object of this invention to provide a new and improved delay line.

Specifically, it is an object of this invention to provide an electronic delay line utilizing multiple sampling and storage.

It is yet another object of this invention to provide an electronic delay line as heretofore set forth wherein the time delay is readily adjustable.

A further object of this invention is to provide an electronic delay line in which the delay line itself may serve as a portion of an oscillator providing sampling pulses.

Other and further objects and advantages of the present invention will be apparent from the following description when taken in connection with the accompanying drawings wherein:

FIG. 3A illustrates the taking of a sample pulse;

FIG. 3B illustrates peak detecting of the sample;

FIG. 3C illustrates application of the resulting voltage to a capacitor for storage and reassembling thereof;

FIG. 3D illustrates the regenerated voltage at the sample location;

Figures 1, 2, 3:
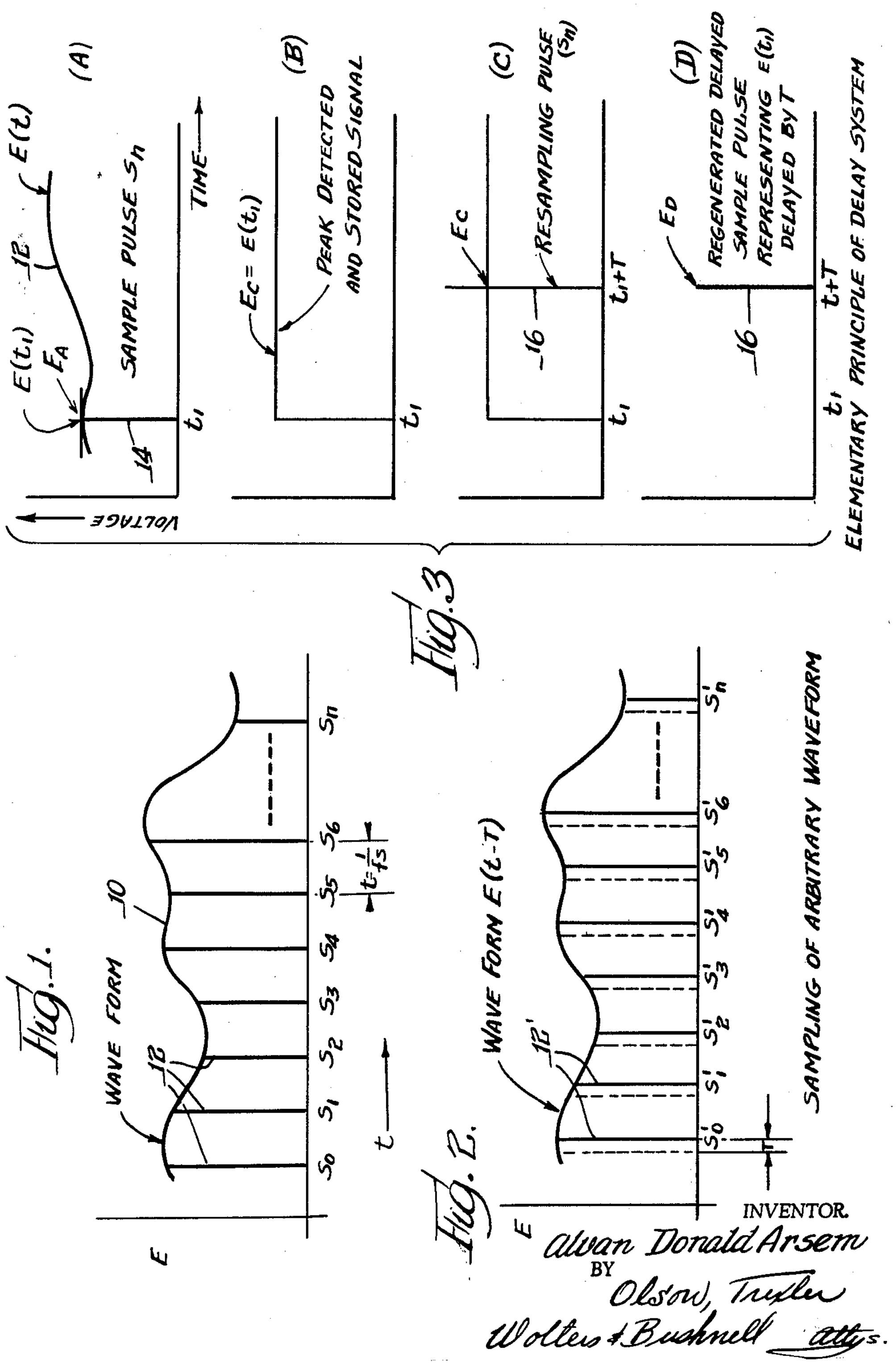
FIG. 1 is a graphical representation of an arbitrary wave form with a set of discrete samples taken therefrom.
FIG. 2 is a similar representation of the delayed signal showing the regenerating samples.
FIG. 3 is a graphical representation of the principle on which the delay line is based.

Referring now in greater particularity to the figures, and first to FIG. 1, there is shown an arbitrary wave form designated generally by the numeral 10. A plurality of samples 12 is taken at regular intervals, as indicated at $S_0$ through $S_n$. The intervals of the sampling pulses are $t=1/f_s$. The wave form is a voltage function of time, and may be referred to as $E(t)$. As shown in FIG. 2, each of the sample locations or pulses is delayed by an amount T and identified at 12', the various sampling locations being indicated as $S'_0$ through $S'_n$. It will be seen that this produces a replica of the wave form of signal 1, but delayed in its entirety by an amount T. The delayed wave form is capable of expression as $E(t-T)$. Furthermore, if the delay time parameter T is varied as a function of time by a control signal, the resulting time delay of the output signal varies as a function of time in accordance with the control signal to produce delay time modulation. The output is continuously variable in delay even though discrete sample intervals are used.

The elementary principle on which the electronic delay line in this invention is based is illustrated in FIG. 3, only one pulse of the sample pulse sequence being shown. Thus, in FIG. 3A there is shown an arbitrary wave form 12 which may or may not be the same as in FIG. 1. A sample of the input wave is taken at T1, the sample being identified by the numeral 14, and the voltage thereof being $E(t_1)$. This sample is peak detected as shown in FIG. 3B and indicated at $E_c=E(t_1)$. This peak detected signal is applied to a capacitor for storage. Subsequently, as shown in FIG. 3C the resampling pulse 16 is taken at a time T later. This voltage subsequently is illustrated in FIG. 3D as $E_D$. The process makes use of the familiar "boxcar" storage principle. It readily may be seen that the resampled amplitude $E_D$ is equal in amplitude to the original sample in FIG. 3A and identified as $E_A$. As will be apparent, there may be some modification by capacitor storage and peak detector losses. However, this is readily compensated for by suitable amplification.

If the foregoing process is repeated on each of the individual sample points in a wave form, utilizing a separate storage capacitor for each "boxcar" sample, it will be seen that the resulting sequence of resamples pulses represents a delayed set of samples corresponding to the original wave form, and hence producing the time delay wave form of FIG. 2. The replica of the wave form as recreated will be delayed in time by an amount equal to the time difference T between sampling pulse $S_n$ and resampling pulse $S'_n$.

Figure 4:
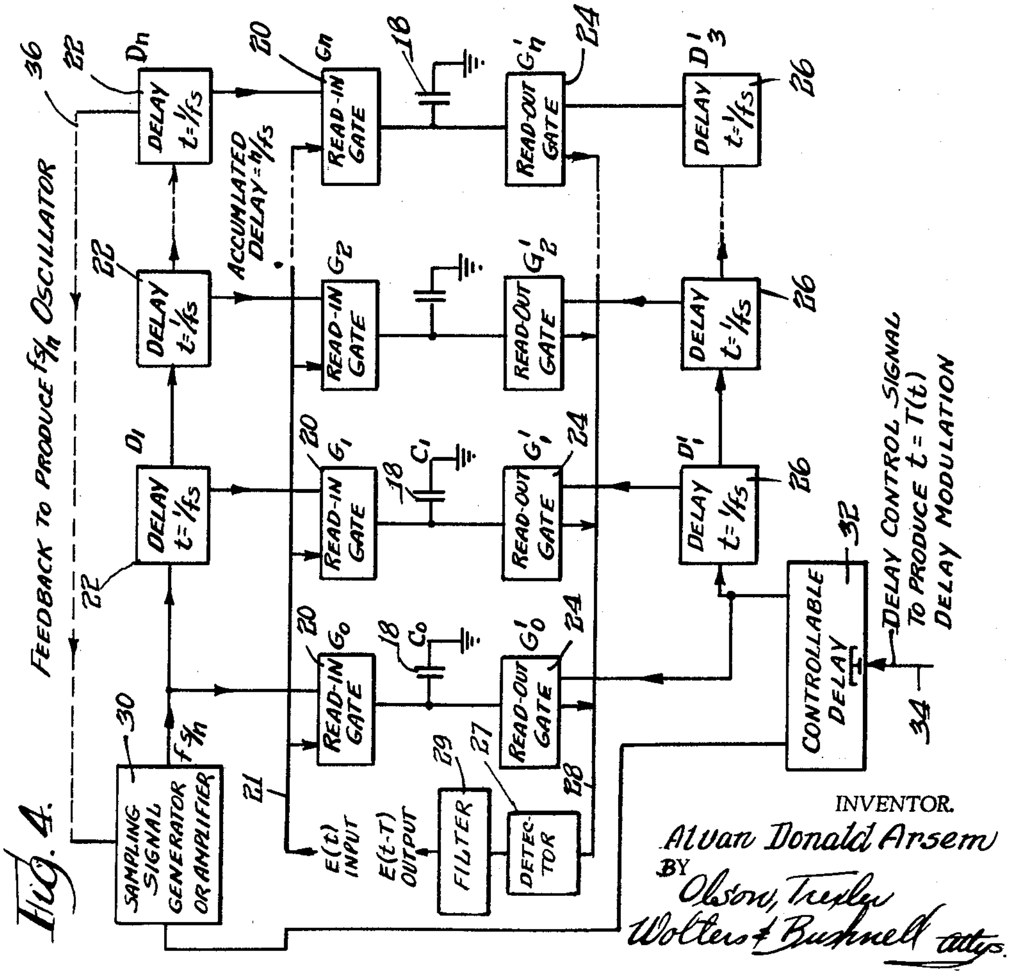
FIG. 4 is a block diagram of the electronic delay line.

A block diagram of a practical electronic delay line based on the foregoing considerations is shown in FIG. 4. As a preferred example, a plurality of storage capacitors 18 is shown, respectively indicated as $C_0$ through $C_n$. From a broad aspect, these are to be considered as devices capable of storing voltage or a function thereof, for instance, current. Read-in elements or gates 20 are disposed above the capacitors and respectively are indicated as $G_0$ through $G_n$. All of the gates 20 are connected to a common input line 21.

The sequence of sample pulses $S_0$ through $S_1$ of the original signal $E(t)$ is taken at successive delay times $1/f_s$. These samples are produced by sequential operation of the gates 20. Gate $G_0$ opens at $t=0$ to take the initial sample of $E(t)$ which is fed to storage capacitor $C_0$. A delayed gate trigger pulse is produced in sequence by each of delay elements 22 connected to gates 20 subsequent to gate $G_0$, and respectively identified as delay element $D_1$ through $D_n$. Thus, the pulse from delay element $D_1$ opens gate $G_1$ at $t=1/f_s$ to provide the next sample $S_1$. The resulting sample amplitude is fed to capacitor $C_1$. Following this in order, gate $G_2$ is opened by a pulse from delay element $D_2$ at $t=2/f_s$ for sample $S_2$ etc. This process continues up to $t=n/f_s$ for the $n$th sample, thus obtaining a sample amplitude stored in each of $n$ capacitors.

The delayed signal is retrieved or recreated by essentially a reverse of this process. Specifically, a delayed sequence of resampling pulses effects reading out of the storage capacitor voltages to provide amplitude information for the sequence of output pulses necessary to recreate the delayed signal. Continuing to refer to FIG. 4, read-out gates or resampling elements 24 are shown below the capacitors 18, and respectively are identified as $G'_0$ through $G'_n$. These read-out elements or gates operate in a manner similar to the sampling gates heretofore mentioned and serve to generate a sequence of resampling pulses, the read-out gates being controlled by delay elements 26, respectively identified as $D'_1$ through $D'_3$, and respectively connected to the correspondingly identified read-out gates.

These resampling pulses provide successive read-outs of the data stored in the capacitor $C_0$ through $C_n$, and may be thought of as sequentially connecting the storage capacitor to the output line 28. The line 28 is connected to a low pass filter 29 to recover the signal $E(t-T)$. A simple diode pulse or peak detector 27 is optionally provided connected to the line 28 to produce an enhanced output. A low pass filter 29 is connected to the detector 27, or direct to the line 28 when the detector is omitted to provide the output indicated at $E(t-T)$. The signal fed to the resampling delay devices $D'_1$ through $D'_n$ is derived from the same source as the read-in pulses, namely, a sampling signal generator 30. Read-in connections are provided direct from the sampling signal generator 30 to the read-in relay devices 22. Connection to the read-out delay devices 26 is through a controllable delay device 32, providing the necessary time delay D. The device 32 may be a well known single-shot multivibrator or a simple phase shifting device. (In instances in which it is desired that T be a variable, a requisite control signal is applied to the delay unit 32 as indicated by the arrow 34 in FIG. 4.) The gating pulses are delayed by $$n/f_s+T(t)$$

The sequence of samples produced on the output line 28 can be filtered to recreate the original signal delayed by T or by $T(t)$.

The delay devices 22 can be utilized as a part of the sampling pulse generator by a feedback connection indicated in dashed lines at 36, thereby forming a delay line oscillator. The frequency of this oscillator depends on the set of delay elements 22, and provides a simple method of insuring synchronism between the sampling rate and the total cycling time for the pulse sequence. Alternatively, a different form of generator may be provided, in which case, it may be inserted as indicated by the generator 30, or it may be inserted by means of an amplifier substituted for the generator 30.

Figure 5:
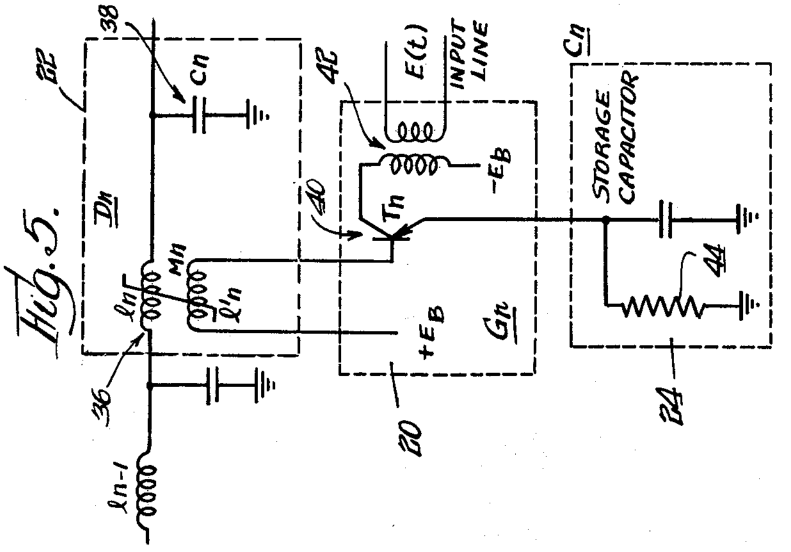
FIG. 5 is a schematic diagram of a portion of the electronic delay line.

A specific circuit for use in the block diagram is shown in FIG. 5, and parts corresponding to those in FIG. 4 are identified by similar indicia. The section of the delay line illustrated in FIG. 5 incorporates the last of the delay elements 22 as identified by $D_n$. It also comprises the read-in gate $G_n$ and the storage capacitor $C_n$. For some commercial purposes, an R-C circuit may be used, but for ultimate quality, an L-C circuit is used.

Thus, in FIG. 5, the delay device $D_n$, like all the delay devices 22, includes a transformer element indicated generally by the numeral 36. This transformer element includes a series connected primary $l_n$, receiving preferably sine wave oscillation from the generator 30. There is a shunting capacitor 38, and in the particular delay device $D_n$ this in indicated as $c_n$. The transformer device also includes a secondary $l'_n$ coupled in non-linear fashion to the primary $l_n$ by use of a square-loop ferrite material. The ferrite material is indicated rather generally at $M_n$. The resulting signal at $l'_n$ is a short pulse, the characteristics of which are determined by the characteristics of the material $M_n$ and the amplitude of the signal at $l_n$.

The read-in gates 20, comprise transistors 40, and particularly the gate $G_n$ identified as $T_n$, each used as a gating transistor. Positive potential is applied through the coil or secondary $l'_n$ to the base of the transistor and negative potential is applied to the collector through the secondary of a transformer 42. The voltage $E(t)$ is connected to the other coil of the transformer 42. The pulse from the coil $l'_n$ therefore is applied to the base and the incoming signal to be sampled is applied as a variable bias to the collector. The resulting signal is connected to a storage capacitor 24, and in particular, the emitter of the transistor 40 is connected to the capacitor $C_n$, the capacitor being shunted by a resistance 44. The signal applied to the capacitor $C_n$ is the amplitude of the signal $E(t)$ during the short time interval defined by the sampling pulse. This signal charges the capacitor $C_n$ to the sample amplitude.

A similar gate circuit $G'_n$ (not shown) is used to enable the stored signal on $C_n$ to be read out to the output line, during the resampling pulse occurrence. As will be apparent, while a sample amplitude is being introduced into $C_n$, a previous sample amplitude is being read out of $C_{n-m}$ where $m$ depends on the value of delay T being used. This obviously continues in cyclic fashion.

As will be apparent to those skilled in the art, the delay line carries the sinusoidal signal at a frequency $f_{s/n}$ where $f_s$ is the sampling rate. The frequency $f_{s/n}$ is necessary because $n$ samples occur during the passage of the sine wave along the length of the delay line.

As hereinafter set forth, a delay-bandwidth characteristic can be achieved within certain limits, based on the sample rates, number of samples, pulse width, etc. For example, the total delay T cannot exceed $nt_s$ where $t_s$ is the sampling pulse. Since $n$ represents the required number of samples, and hence the number of sample storing capacitors, etc., a simple relation exists and is of value in estimating equipment complexity versus performance. This can be expressed as $$T=nt_s=n/f_s=n/2f_c$$

where $f_c$ is the upper cutoff frequency defined by the sampling theorem. A figure of merit often used in delay lines is the delay-bandwidth product, thus, in this case $$Tf_c=n/2$$

It will be seen that for audio bandwidths, for example, $f_c$ equals 10,000 c.p.s., and a relatively small, finite number of samples, such as $n=20$, a controllable delay of up to one millisecond is readily attained. This type of performance has been difficult to achieve by any other physically simple delay line heretofore known. It has been necessary to resort to carrier type delay elements using mercury lines, quartz, glass, etc., which obviously have certain limitations in environments requiring transportation, shock, etc.

A prime importance of the invention herein described is that it allows voltage control of the delay for modulation and control applications.

Although one specific example of the invention has been shown and described herein, it will be understood that this is for exemplary purposes only. Various changes in structure will, no doubt, occur to those skilled in the art, and will be understood as forming a part of the present invention insofar as they fall within the spirit and scope of the appended claims.

I claim:

1. An electronic delay line comprising input means for receiving an electric signal to be delayed, a plurality of read-in gates respectively connected to said input means, a plurality of voltage storage devices respectively connected to said read-in gates, a plurality of read-out gates respectively connected to said voltage storage devices, output means connected to said read-out gates, timing generator means, a series of read-in time-delay pulse-producing means connected to said timing generator means, means respectively connecting said time-delay pulse-producing means to said read-in gates momentarily to open said read-in gates in predetermined time sequence, each read-in gate being opened thereby irrespective of the condition of any other read-in gate, and a series of read-out time-delay pulse-producing means connected to said timing generator means for producing a sequence of pulses delayed in time relative to the first mentioned pulses but otherwise in the same sequence, said series of read-out time-delay pulse-producing means respectively being connected to said read-out gates for momentarily opening each of said read-out gates in the same time sequence, but delayed in time, irrespective of the condition of any other read-out gate.

2. An electronic delay line as set forth in claim 1, wherein the read-out series of time-delay pulse producing delay means is connected to the generator by a time delay device.

3. An electronic delay line comprising input means for receiving an electric signal to be delayed, a plurality of read-in gates respectively connected to said input means, a plurality of storage capacitors respectively connected to said read-in gates, a plurality of read-out gates respectively connected to said voltage storage capacitors, output means connected to said read-out gates, timing generator means, a series of read-in time-delay pulse-producing means connected to said timing generator means, a common control signal source, read-in delay means respectively connecting said common control signal source to said read-in gates momentarily to open each of said gates in a predetermined time sequence, each read-in gate being opened thereby irrespective of the condition of any other read-in gate, a time delay device connected to said timing generator means, and a series of read-out time-delay pulse-producing means respectively connected to said read-out gates for momentarily opening each of said read-out gates in the same time sequence but delayed in time, each of said read-out gates being opened thereby irrespective of the condition of any other read-out gate.

4. An electronic delay line as set forth in claim 3 wherein the time delay device is controllable as to delay.

5. An electronic delay line comprising input means for receiving an electric signal to be delayed, a plurality of read-in gates respectively connected to said input means, a plurality of voltage storage means respectively connected to said read-in gates, a plurality of read-out gates respectively connected to said storage devices, output means connected to said read-out gates, oscillator means, a plurality of delay devices serially connected to said oscillator means and to one another, a feedback means from a remote one of said delay devices to said oscillator means, said oscillator means, delay devices and feedback means thereby comprising a delay line oscillator, a plurality of means respectively connected to said delay devices and to said read-in gates momentarily to open each gate in sequence, and means connected to said oscillator means to open the read-out gates momentarily in the same sequence but delayed in time therefrom.

6. An electronic delay line comprising input means for receiving an electric signal to be delayed, a plurality of read-in gates respectively connected to said input means, a plurality of voltage storage devices respectively connected to said read-in gates, a plurality of read-out gates respectively connected to said voltage storage devices, output means connected to said read-out gates, a delay control signal source, a delay line comprising a plurality of time-delay pulse-producing elements connected in series to said delay control signal source, the elements of said delay line respectively being connected to said read-in gates for momentarily opening said read-in gates sequentially, each read-in gate being opened thereby irrespective of the condition of any other read-in gate, a similar read-out delay line, means including delay means connecting said read-out delay line to said delay control signal source, said read-out delay line having a plurality of time-delay pulse-producing elements respectively connected to said read-out gates for momentarily opening each of said read-out gates in the same sequence in which the read-in gates are opened, but delayed in time, each read-out gate being opened thereby irrespective of the condition of any other read-out gate.

7. An electronic delay line as set forth in claim 6 wherein the delay control signal source comprises an amplifier, and further including feed-back means from the first-mentioned delay line to said amplifier, said amplifier and said first-mentioned delay line comprising a delay line oscillator.

8. An electronic delay line comprising input means for receiving an electric signal to be delayed, a plurality of read-in gates respectively connected to said input means, a plurality of voltage storage devices respectively connected to said read-in gates, a plurality of read-out gates respectively connected to said voltage storage devices, output means connected to said read-out gates, a sine wave oscillator, means including sequential delay means connected to said sine wave oscillator and respectively to said read-in gates for momentarily opening each of said read-in gates in predetermined time sequence, and further sequential delay means connected to said sine wave generator and respectively to said read-out gates for momentarily opening each of said read-out gates in the same time sequence in which the read-in gates are opened, but delayed in time.

9. An electronic delay line comprising input means for receiving an electric signal to be delayed, a plurality of read-in gates respectively connected to said input means, a plurality of storage devices respectively connected to said read-in gates to receive and store voltage samples, a plurality of read-out gates respectively connected to said voltage storage means, output means connected to said read-out gates, each of said read-in and read-out gates comprising a transistor, means normally biasing all of said transistors off, control means, means connecting said control means to the transistors of said read-in gates momentarily to open each of said read-in gate transistors in a predetermined time sequence, and means connecting said control means to said read-out gate transistors for momentarily biasing each read-out gate transistor on in the same time sequence, but delayed in time.

10. An electronic delay line comprising input means for receiving an electric signal to be delayed, a plurality of read-in gates respectively connected to said input means, a plurality of voltage storage devices respectively connected to said read-in gates, a plurality of read-out gates respectively connected to said voltage storage devices, output means connected to said read-out gates, means for producing a sequence of pulses delayed in time and connected to said read-in gates for momentarily opening each of said read-in gates in predetermined time sequence, and further means for producing a sequence of pulses delayed in time relative to the first pulses but otherwise in the same sequence, said further pulse-producing means being connected to said read-out gates for momentarily opening each of said read-out gates in the same time sequence, but delayed in time, said generator comprising a sine wave generator and each of said pulse-producing delay devices including a pulse-producing nonlinear transformer.

References Cited by the Examiner

UNITED STATES PATENTS 3,087,143 4/63 Bayly ---------------- 340—173

IRVING L. SRAGOW, *Primary Examiner.*